Patented Jan. 2, 1934

1,942,109

UNITED STATES PATENT OFFICE 1,942,109

PROCESS OF PREPARING PEANUT FLOUR FOR THE MANUFACTURE OF ADHESIVES

Irving F. Laucks, Seattle, Wash., assignor to I. F. Laucks Inc., Seattle, Wash., a corporation of Washington No Drawing. Application January 19, 1928
Serial No. 248,015

3 Claims. (Cl. 87—17)

My invention relates to the process of preparing peanut flour for the manufacture of adhesives.

By peanut flour I mean the ground residue remaining after the oil has been removed from peanuts, in whole or in part, such removal being accomplished by pressure or extraction with solvents or by both pressure and extraction with solvents by any of several well known methods. I have discovered that heating peanut flour and subsequently cooling same prior to mixing with the other raw materials which are ingredients of commercial vegetable protein containing adhesives, sizes and the like, markedly increases the strength and water resistance of the resultant adhesives. I believe that such heating of the peanut flour has as one effect the partial coagulation of the protein material contained therein.

Herein, the heating of the peanut flour and subsequent cooling of same will be referred to as processing of peanut flour, and the product as processed peanut flour.

One method of processing peanut flour which I have used consists of passing the peanut flour by mechanical means through a steam jacketed cylinder at such a rate that each particle of flour is exposed to the effect of the heat for a period of five minutes, steam pressure in the jacket being approximately eighty pounds. The flour is sacked off and allowed to stand until cooled to room temperature. The product is then to be considered as processed peanut flour.

This is only one method which may be used of applying heat to peanut flour but may serve as an illustration of the production of my improved base for use in manufacture of adhesives.

To illustrate the marked benefit resulting from the processing of the peanut flour used as a base for adhesives, I give below results of a few of my many experiments using processed and unprocessed peanut flour in adhesive formulæ otherwise identical.

A. Intimately mix in the dry state, in a suitable mixing device, 300 parts of unprocessed peanut flour and 9 parts of hydrated lime. Place 600 parts of water in a suitable mixing device and add mixture of unprocessed peanut flour and hydrated lime. Mix three minutes and add 180 parts of water together with 36 parts flake caustic soda dissolved in 75 parts of water and mix well. Add 17.5 parts of a mixture of 50% carbon bisulphide and 50% carbon tetrachloride and stir fifteen minutes. Add 195 parts of water and stir in. All parts noted herein are parts by weight. The adhesive is then ready to be spread, on plywood, for example.

B. Same formula and procedure throughout except that processed peanut flour was used.

Fir plywood was spread with adhesives A and B and made up into three ply veneer by the customary veneer plant practice. Test pieces were cut out and the dry adhesive strength of the glue determined by method commonly used in the trade, and also the adhesive strength was determined using test pieces which had been soaked in water for forty-eight hours, the result of the later test being known as "wet adhesive strength".

The results of the tests were as follows:

|   | Dry strength | Wet strength |
|---|---|---|
|   | Pounds per square inch | Pounds per square inch |
| A | 162 | 0 |
| B | 232 | 43 |

From the above results it will be noted that my discovery provides a means of increasing the dry adhesive strength more than fifty percent and that a measurable water resistant property has been secured where none existed before.

In further illustration of the improvement in adhesives resulting from my discovery, I give below results of tests using another adhesive formula.

C. Intimately mix in the dry state, in a suitable mixing device, 300 parts unprocessed peanut flour, 52.5 parts hydrated lime, 40 parts of soda ash. Place 225 parts of water in a suitable mixing device, add 100 parts of the above described mixture of dry ingredients, stir seventeen minutes. Add 4 parts of a mixture of 50% carbon bisulphide and 50 parts of carbon tetrachloride together with 100 parts of water. Stir five minutes. The adhesive is then ready to apply to plywood or other material.

D. Same formula and procedure throughout except that processed peanut flour was used.

Gum plywood was spread with adhesives C and D and made up into three ply veneer. Tests were made as in the case of A and B above and the results are given below:

|   | Dry strength | Wet strength |
| --- | --- | --- |
|   | Pounds per square inch | Pounds per square inch |
| C | 153 | 83 |
| D | 235 | 105 |

It will be seen that my treatment of the adhesive base has increased the dry strength of the resultant adhesive over fifty percent and the water resistance of the adhesive is evidenced by the increase of wet adhesive strength twenty-five percent.

As an indication of the marked effect of processing on peanut flour, I give below results obtained by testing viscosities of adhesives C and D in a MacMichael viscosimeter using a No. 26 wire, a one centimeter cylindrical plunger and the standard large inner cup. Results are given in scale divisions:

|   | Viscosity taken immediately after completion of mixing | Viscosity after adhesive has stood one hour at constant temperature |
| --- | --- | --- |
| C | 22 | 142 |
| D | 112 | 203 |

The higher viscosity in the case of adhesive D is a clear indication of a positive effect having been produced upon the peanut flour by the above described processing, i. e., that a positive and beneficial change was produced in the flour.

Also, I give below viscosities on more simple mixtures of processed and unprocessed peanut flour with water and caustic soda as indication of the effect of processing.

E. Place 400 parts of water in a suitable mixing device together with 8 parts of caustic soda and 100 parts of unprocessed peanut flour. Stir 15 minutes. Determine viscosity in MacMichael viscosimeter under condition as stated for C and D.

F. Same as E but use processed peanut flour.

|   | Viscosity taken immediately after mixing |
| --- | --- |
| E | 32 |
| F | 48 |

I, of course, do not confine myself to the above described formulæ in the use of my improved base for adhesives, inasmuch as I have used many others with successful results and these above are given merely as illustrations. Neither do I confine myself to the method, temperature, and time of processing of peanut flour described above, as variations of the same are effective in improving the peanut flour as a base for adhesives. I have discovered that heating peanut flour improves its properties as a base for adhesives.

I claim:—

1. In the process of preparing peanut flour for use as a base in the manufacture of adhesives, the step of separately exposing for about five minutes the said flour to that degree of heat obtaining in a steam-jacketed container with steam in the jacket under about eighty pounds pressure.

2. The process of forming an adhesive having peanut flour as a base comprising heating the flour after the oil has been expressed therefrom until the protein has been at least partially coagulated and dispersing said flour in an aqueous alkaline medium, said heated flour being characterized in that it imparts to the resultant adhesive a marked increase in viscosity, water resistance and strength.

3. An adhesive composition having a peanut flour base comprising an oil-free peanut flour, the protein of which has been at least partially coagulated by heat, and an alkaline aqueous dispersion medium, said flour being characterized in that it imparts to the resultant adhesive a marked increase in viscosity, water resistance and strength.

IRVING F. LAUCKS.